Feb. 10, 1970    K. H. BRECH    3,494,179
PULSE ECHO ULTRASONIC TESTING APPARATUS
WITH SIGNAL ATTENUATION COMPENSATION

Filed Jan. 6, 1967    2 Sheets-Sheet 1

INVENTOR.
KILIAN H. BRECH

BY Ervin B. Steinberg

INVENTOR.
KILIAN H. BRECH
BY
Ervin B. Steinberg

United States Patent Office 3,494,179
Patented Feb. 10, 1970

3,494,179
PULSE ECHO ULTRASONIC TESTING APPARATUS WITH SIGNAL ATTENUATION COMPENSATION
Kilian H. Brech, Norwalk, Conn., assignor to Branson Instruments Incorporated, Stamford, Conn., a corporation of Delaware
Filed Jan. 6, 1967, Ser. No. 607,828
Int. Cl. G01n 29/04
U.S. Cl. 73—67.7       19 Claims

ABSTRACT OF THE DISCLOSURE

In a pulse echo ultrasonic test apparatus a circuit element having a negative temperature coefficient of electrical resistivity (thermistor) is disposed to be affected by the temperature of the workpiece and is coupled in circuit to vary the electrical signals in dependence on the temperature of the workpiece. This arrangement provides compensation for the decreasing electrical signal amplitude resulting from increasing acoustic signal path losses when testing hot objects.

---

Figure 1:
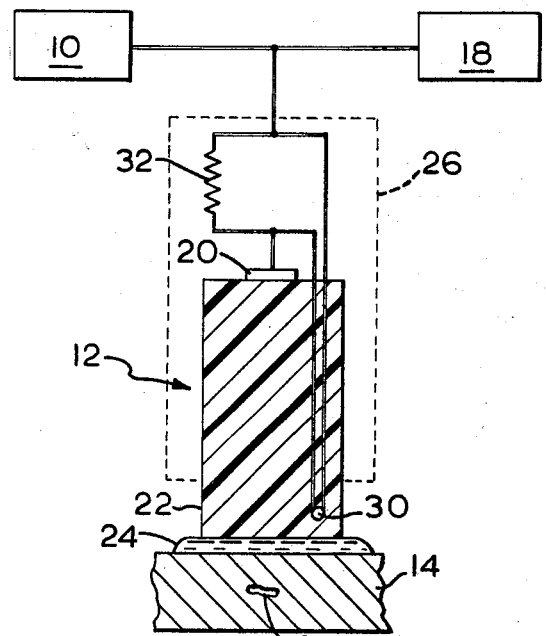

This invention relates to a pulse echo ultrasonic testing apparatus and has specific reference to an ultrasonic testing arrangement wherein electrical circuit means are provided which compensate for the acoustic signal attenuation experienced when testing hot objects. More specifically, this invention concerns the use of temperature responsive means connected in circuit with the pulse echo testing apparatus for varying the electrical signals in dependence on the temperature of the workpiece effective upon the transducer probe which applies ultrasonic energy to the workpiece and receives echo signals therefrom.

When testing hot workpieces with the ultrasonic pulse echo test method, the amplitude of the echo signal received from the workpiece decreases rapidly because of increased losses in the acoustic signal path. This signal attenuation is caused by a heating of the couplant disposed between the transducer probe and the hot work piece, and by the heat affecting the solid coupling means which is normally interposed between the object surface and the electro-acoustic transducer for providing a heat barrier between the workpiece and the transducer (piezoelectric) material. It is necessary, therefore, to steadily increase the gain control, usually provided in the electronic circuitry, in order to maintain the received pulses at a discernible level. While such steady readjustment is possible in manually operated systems, this procedure is not readily available in automated systems. The present invention is directed toward an arrangement wherein temperature compensation is provided in the electronic circuit so as to maintain the electrical signals at a measurable level despite increasing attenuation of the acoustic signal path resulting from increasing temperature effective upon the transducer and the couplant.

One of the principal objects of this invention, therefore, is the provision of an improved circuit for pulse echo ultrasonic testing, which overcomes the signal attenuation experienced when measuring hot objects.

Another important object of this invention is the provision of an improved circuit arrangement for pulse echo ultrasonic testing wherein means are provided for varying the electrical output signals in dependence on the temperature of the workpiece effective upon the acoustic signal path.

Another important object of this invention is the provision of an ultrasonic pulse echo circuit in which temperature responsive means are coupled in circuit with the electrical signals responsive to acoustic echo signals, whereby to vary the output signals in dependence on the temperature of the workpiece effective upon the coupling means as the latter applies ultrasonic signals to a hot workpiece under test.

Another object of this invention is the provision of a circuit means having a negative temperature coefficient of resistivity coupled in circuit with ultrasonic pulse echo circuits in order to maintain electrical signals at a discernible, possibly constant, level despite increasing attenuation in the acoustic signal path caused by temperature dependent losses.

Figure 2:
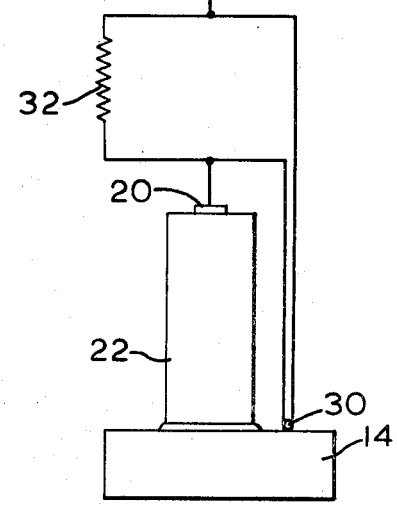
Figure 4:
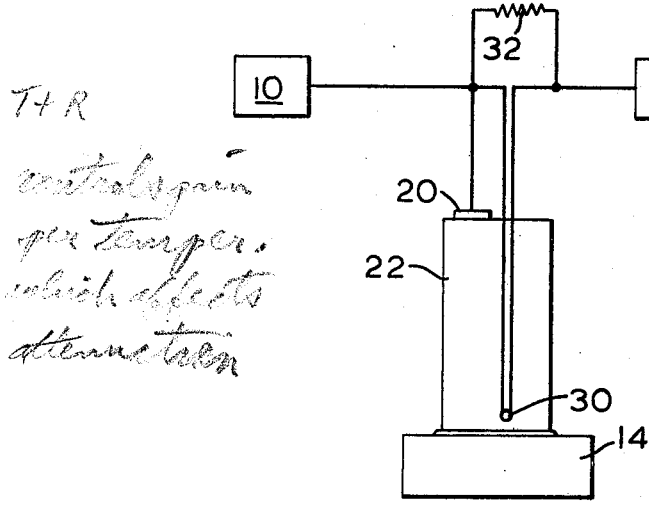
Figure 3:
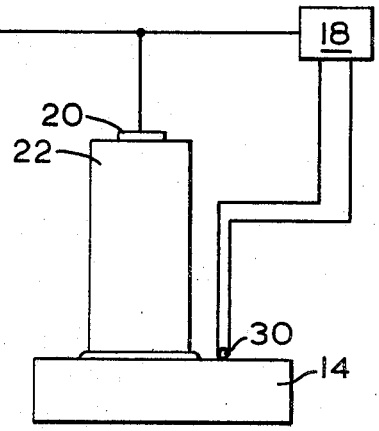
Figure 5:
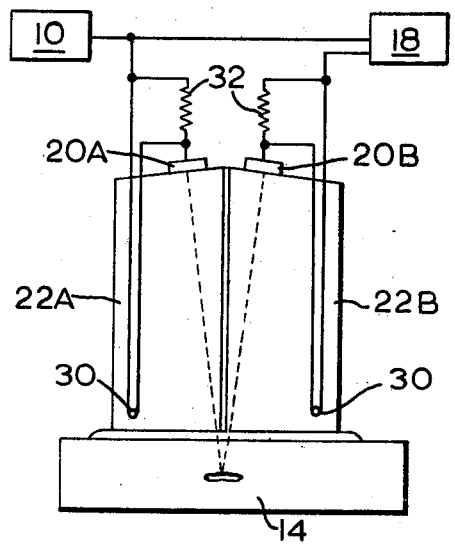
Figure 6:
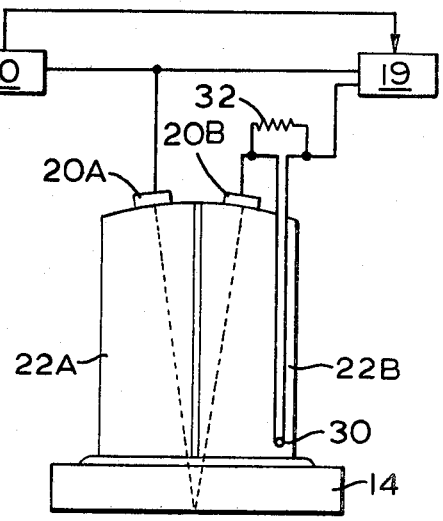
Figure 7:
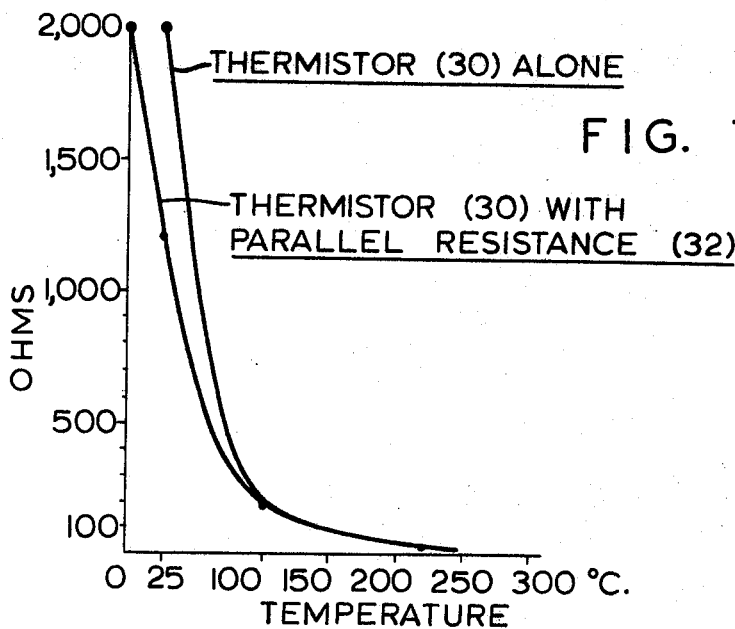

Further and still other objects of this invention will be more clearly apparent by reference to the following description when taken in conjunction with the accompanying drawings, in which:

FIGURE 1 is a schematic diagram of a typical embodiment of the present invention;
FIGURE 2 shows an alternative arrangement;
FIGURE 3 is a schematic diagram of another alternative embodiment;
FIGURE 4 is a schematic diagram of a further alternative embodiment;
FIGURE 5 is a schematic diagram of another alternative embodiment;
FIGURE 6 is a schematic diagram of a still further and alternative embodiment of the present invention, and
FIGURE 7 is a diagram of temperature v. resistance of the temperature responsive compensation circuit.

Referring now to the figures and FIGURE 1 in particular, there is shown a conventional pulse echo ultrasonic test system comprising a pulser 10 which transmits periodically a train of pulses at ultrasonic frequency to an electro-acoustic transducer probe 12 which is coupled to a workpiece 14, such as a hot steel plate. As the probe sends ultrasonic pulses into the workpiece any change in acoustic impedance, such as a flaw 16, provides a reflection, which manifests itself as an echo pulse which is transmitted by the transducer probe 12 to a receiver 18 and displayed by means of a suitable indicating means, such as a meter, or a cathode ray tube. In automated systems, control circuits are actuated in response to the presence or absence of an echo signal.

The electro-acoustic transducer probable, as is well understood by those skilled in the art, comprises essentially and in the preferred embodiment, a wafer of piezoelectric material 20, e.g. lithium sulfate, which is coupled to a coupling means 22, the latter being a solid piece of polymeric thermoplastic material (methyl methacrylate, polystyrene, polyimide etc.) for providing thermal insulation between the hot workpiece 14 and the piezoelectric material 20. In order to provide good acoustic coupling between the transducer and the workpiece surface, there is interposed quite conventionally a thin film of a suitable couplant 24, typically glycerine, or a film of silicone grease.

While the transducer probe is in contact with the hot workpiece, having a temperature of several hundred degrees, the heat of the workpiece affects the couplant 24 as well as the coupling means 22, causing heating and softening thereof whereby the acoustic signal path is attenuated. This attenuation manifests itself as a heat responsive degradation of the acoustic signals and particularly of the echo responsive electrical signals reaching the receiver circuit 18. In order to maintain the signal as initially observed on the receiver 18 at a readable level, a steady readjustment of the gain control is necessary. In order to alleviate this condition, in accordance with the present invention, a temperature responsive electrical circuit element 30 is disposed in the coupling means 22 in the vicinity of the contact between the coupling means and the workpiece. This circuit element 30 in the preferred embodiment is a thermistor, a device having a negative temperature coefficient of resistivity, thus decreasing its electrical resistance with increasing temperature. The thermistor 30 is connected in series with the piezoelectric material 20 and the connection thereof to the pulser 10 and the receiver 18. Therefore, the electrical circuit resistance in series with the transducer 20 decreases as the temperature effective upon the coupling means 22 increases, thereby providing automatic compensation for the increased acoustic losses in the signal path between the piezoelectric transducer 20 and the workpiece 14.

In order to limit the electrical resistance of the thermistor 30 at room temperature and at temperatures below normal ambient temperatures, a standard resistor 32 having a positive temperature coefficient of resistivity is connected in parallel. Typically, the thermistor is model No. 32A12 available from the Victory Engineering Corporation, Springfield, N.J., having a resistance of approximately 2,000 ohms at room temperature, while the parallel resistance 32 is approximately 3,000 ohms. Thus, the increase of the circuit resistance with decreasing temperature is limited.

As shown in FIGURE 1, the thermistor 30 is imbedded in the coupling means 22 and is disposed to one side so as not to interfere with the acoustic signal path. Also, the connections to the thermistor and the parallel resistance 32 are disposed within the transducer enclosure 26, the latter being indicated generally by dashed lines. In this manner a unitary transducer assembly is achieved.

An alternative arrangement is shown in FIGURE 2 wherein the temperature responsive means, thermistor 30, does not form a part of the transducer assembly, but it is placed in direct contact with the workpiece 14.

FIGURE 3 shows a further alternative embodiment wherein the temperature responsive circuit means 30 is in contact with the workpiece 14 and its electrical terminals are connected directly to the receiver 18 for providing a control signal to one of the usual amplifying stages contained in the receiver.

FIGURE 4 discloses and arrangement wherein the pulse signal from the pulser 10 is applied directly to the piezoelectric transducer 20 and the thermistor 30 is disposed solely in the echo receiving circuit.

FIGURE 5 shows a typical pulse echo arrangement wherein a dual transducer probe is used. The piezoelectric transducer 20A and the coupling means 22A form the pulse transmitting portion of the transducer probe, and the transducer 20B and coupling means 22B form the echo receiving portion.

A temperature responsive electrical circuit means 30 is inserted in each of the transducer probe portions so as to modify the pulse signal and the echo pulse signal in dependence on the temperature of the workpiece effective upon the transducer.

FIGURE 6 discloses the arrangement as described in copending application for U.S. Letters Patent Ser. No. 532,037 filed Jan. 27, 1966, entitled "Ultrasonic Inspection Method and Apparatus." The pulser 10 provides an electrical pulse signal to the transducer 20A which sends an acoustic pulse through the coupling means 22A into the workpiece 14. A timing circuit 19 is started in response to the receipt of an interface signal which is caused by the interface between the coupling means 22A and the entrant surface of the workpiece 14 as sensed by the piezoelectric transducer 20A. A subsequent echo signal originating from within the workpiece and sensed by the piezoelectric transducer 20B stops the timing circuit 19. A temperature sensitive circuit means, a thermistor 30, is inserted into the receiving portion of the transducer in order to modify the signal, that is to maintain the electrical pulse signal amplitude, at a desired level despite an increase of acoustic signal path losses caused by increasing temperature of the couplant and coupling means.

FIGURE 7 is a schematic graph showing the electrical circuit resistance versus temperature of the thermistor 30 alone and the improved circuit characteristic when the thermistor is in parallel with a resistance 32.

It will be apparent that the foregoing arrangement is extremely valuable and effective for maintaining the signal amplitude in automated systems at a discernible level despite changes of impedance in the acoustic signal path.

While there have been described and illustrated certain prefered embodiments of my invention, it will be apparent to those skilled in the art that many other and further variations may be made without departing from the broad principle and scope of this invention.

What is claimed is:

1. An ultrasonic pulse-echo transducer probe for use with an ultrasonic pulse-echo test apparatus, said probe including a piezoelectric means and a solid acoustic coupling means in acoustic contact therewith for being interposed between said piezoelectric means and a hot workpiece surface, said coupling means being of a material providing thermal insulation and an acoustic signal path between the workpiece and the piezoelectric means, wherein the improvement comprises:

electrical circuit means having a negative temperature coefficient of resistivity coupled in electrical circuit with said piexoelectric means and disposed to be responsive to the temperature of the workpiece effective upon said coupling means at the area of contact between said coupling means and workpiece, said circuit means lowering the electrical circuit impedance between said piezoelectric means and said apparatus responsive to an increase in the temperature at the area of contact between said coupling means and workpiece.

2. An ultrasonic pulse echo transducer probe as set forth in claim 1 and an electrical resistance means having a positive temperature coefficient of resistivity coupled in parallel with said means having a negative temperature coefficient of resistivity.

3. An ultrasonic pulse echo transducer probe as set forth in claim 2 wherein said means having a negative coefficient of resistivity is disposed within said coupling means.

4. An ultrasonic pulse echo transducer probe as set forth in claim 2, said transducer probe being of the dual transducer probe construction having a pulse transmitter and an echo pulse receiver section, and said means having a negative coefficient of resistivity being associated with said receiver section.

5. An ultrasonic pulse-echo transducer probe as set forth in claim 2, said transducer probe being of the dual transducer probe construction having a pulse transmitter and an echo pulse receiver section, and said electrical circuit means having a negative temperature coefficient of resistivity comprising a pair of such means, one coupled in electrical circuit with the electrical signals in each section.

6. In a pulse-echo ultrasonic test apparatus wherein an electrical signal circuit is provided from an electrical pulse circuit to an electro-acoustic transducing means and from said transducing means to a signal receiving circuit, and an acoustic signal path is provided through an interposed coupling means between said transducing means and the surface of a hot workpiece, said coupling means acting as a heat barrier between said transducing means and the surface of the object, the improvement comprising:

temperature responsive means disposed to be responsive to the temperature of the coupling means substantially at the area of contact of the coupling means with the object surface and electrically coupled to said receiving circuit to provide compensation for the degradation of electrical signals from said transducing means to said receiving circuit resulting from the attenuation of acoustic signals traversing the portion of the coupling means heated by contact with the object.

7. In a pulse-echo ultrasonic test apparatus as set forth in claim 6, said temperature responsive means being an electrical circuit element having a negative temperature coefficient of electrical resistivity.

8. In a pulse-echo ultrasonic test apparatus as set forth in claim 6, said temperature responsive means being a thermistor coupled in said electrical signal circuit from said transducing means to said signal receiving circuit for reducing the electrical circuit impedance of said circuit in response to rising temperature at said area of contact.

9. In a pulse-echo ultrasonic test apparatus as set forth in claim 8, said interposed coupling means being at least in part a solid piece of material and said thermistor being disposed in contact with said solid coupling means in proximity to that one of its surfaces adapted to engage the workpiece.

10. In a pulse-echo ultrasonic test apparatus as set forth in claim 9, said solid piece of material being polymeric plastic material.

11. In a pulse-echo ultrasonic test apparatus as set forth in claim 6, said temperature responsive means coupled to an amplifying stage forming a part of said signal receiving circuit.

12. A pulse-echo ultrasonic test apparatus for exploring a workpiece comprising:
electrical pulsing means for cyclically providing a train of electrical pulses at an ultrasonic frequency;
a transducer probe including an electro-acoustic transducing means and a coupling means coupled with one of its surfaces to said transducing means and serving as a heat barrier for said transducing means when an opposite surface of said coupling means is in contact with a hot workpiece, said transducing means adapted to receive said electrical pulses and in response thereto cyclically causing acoustic search signals to be transmitted through said coupling means and a couplant into a workpiece with which said coupling means is in acoustic energy transferring contact;
a pulse receiving circuit adapted to be coupled to said electro-acoustic transducing means for receiving therefrom electrical signals which are responsive to acoustic echo signals resulting from acoustic discontinuities intercepted by said respective search signals and such echo signals reaching said transducing means after transmission through said coupling means, and
temperature responsive means disposed to be responsive to the temperature at the interface between said coupling means and workpiece and connected in series with said transducing means to reduce the impedance of the electrical circuit from said transducing means to said receiving circuit as the acoustic signal strength diminishes resulting from increasing temperature of the coupling means at the area of its contact with the workpiece.

13. A pulse-echo ultrasonic test apparatus for exploring a workpiece as set forth in claim 12, said temperature responsive means being a resistive element having a negative temperature coefficient of electrical resistivity.

14. A pulse-echo ultrasonic test apparatus for exploring a workpiece as set forth in claim 13 and a further resistive element connected in parallel with said temperature responsive means for limiting at relatively low temperatures the electrical circuit impedance of the circuit which includes said temperature responsive means.

15. A pulse-echo ultrasonic test apparatus for exploring a workpiece as set forth in claim 14, said temperature responsive means being disposed in said coupling means in proximity to the area of contact between said coupling means and workpiece.

16. A pulse-echo ultrasonic test apparatus for exploring a workpiece as set forth in claim 14, said temperature responsive means being disposed outside of said coupling means in proximity to the area of contact between said coupling means and workpiece.

17. A pulse-echo ultrasonic test apparatus for exploring a workpiece as set forth in claim 14, said temperature responsive means being connected serially in the electrical circuit connection from said transducing means to said pulse receiving circuit.

18. The method of exploring a hot workpiece by the pulse-echo ultrasonic method comprising the steps of:
transmitting an ultrasonic acoustic pulse signal through a heat insulating coupling means into a workpiece;
receiving through said coupling means an acoustic echo pulse signal which is responsive to a change in acoustic impedance encountered by said transmitted pulse signal;
transforming said echo pulse signal into an electrical signal, and
passing said electrical signal through a temperature responsive variable impedance device adapted to lower its circuit impedance responsive to a rising temperature and being disposed adjacent the interface surface between the workpiece and said coupling means for providing compensation for the degradation of the echo responsive electrical signal as a function of heat responsive attenuation of the acoustic echo pulse signal traversing a hot portion of the coupling means.

19. The method for exploring a hot workpiece as set forth in claim 18, said electrical signal being passed through an electrical circuit element having a negative coefficient of electrical resistivity.

References Cited

UNITED STATES PATENTS

| | | | |
|---|---|---|---|
| 2,697,936 | 12/1954 | Farrow | 73—67 |
| 3,158,928 | 12/1964 | De Frisco et al. | 29—470.1 |
| 3,218,570 | 11/1965 | Godier | 330—143 |
| 3,006,184 | 10/1961 | Goldman | 73—67.8 |
| 3,060,748 | 10/1962 | Schwartz | 73—497 |
| 3,242,723 | 3/1966 | Evans | 73—71.5 |
| 3,393,331 | 7/1968 | Packett | 310—8.3 |

JAMES J. GILL, Primary Examiner